(No Model.) 4 Sheets—Sheet 3.
W. R. HITCHCOCK.
INSULATOR, CONDUCTOR, AND CONDUIT FOR ELECTRICAL WIRES AND CABLES.
No. 546,232. Patented Sept. 10, 1895.
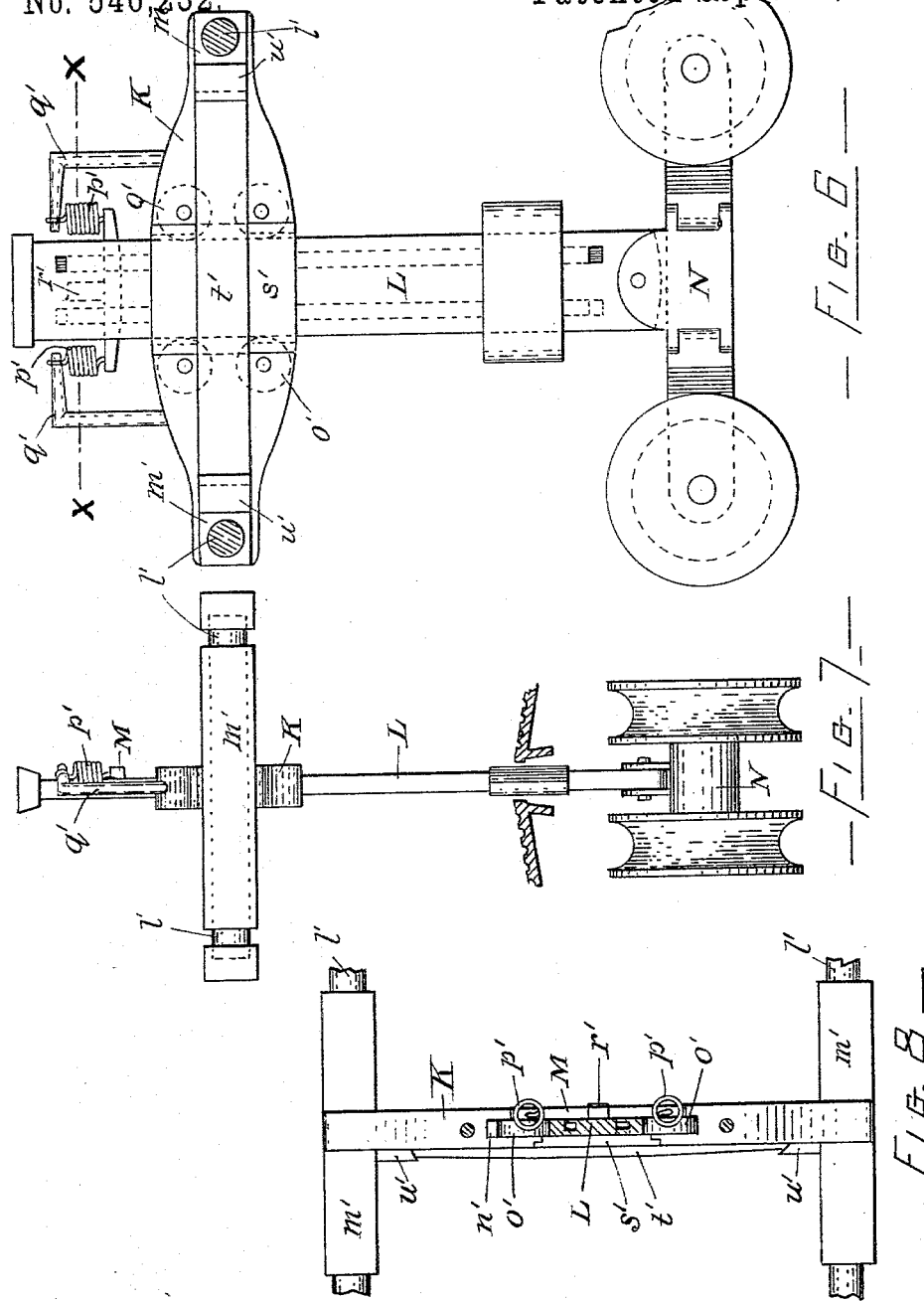
Witnesses:
Inventor:
Wilber Ruben Hitchcock
by attorneys

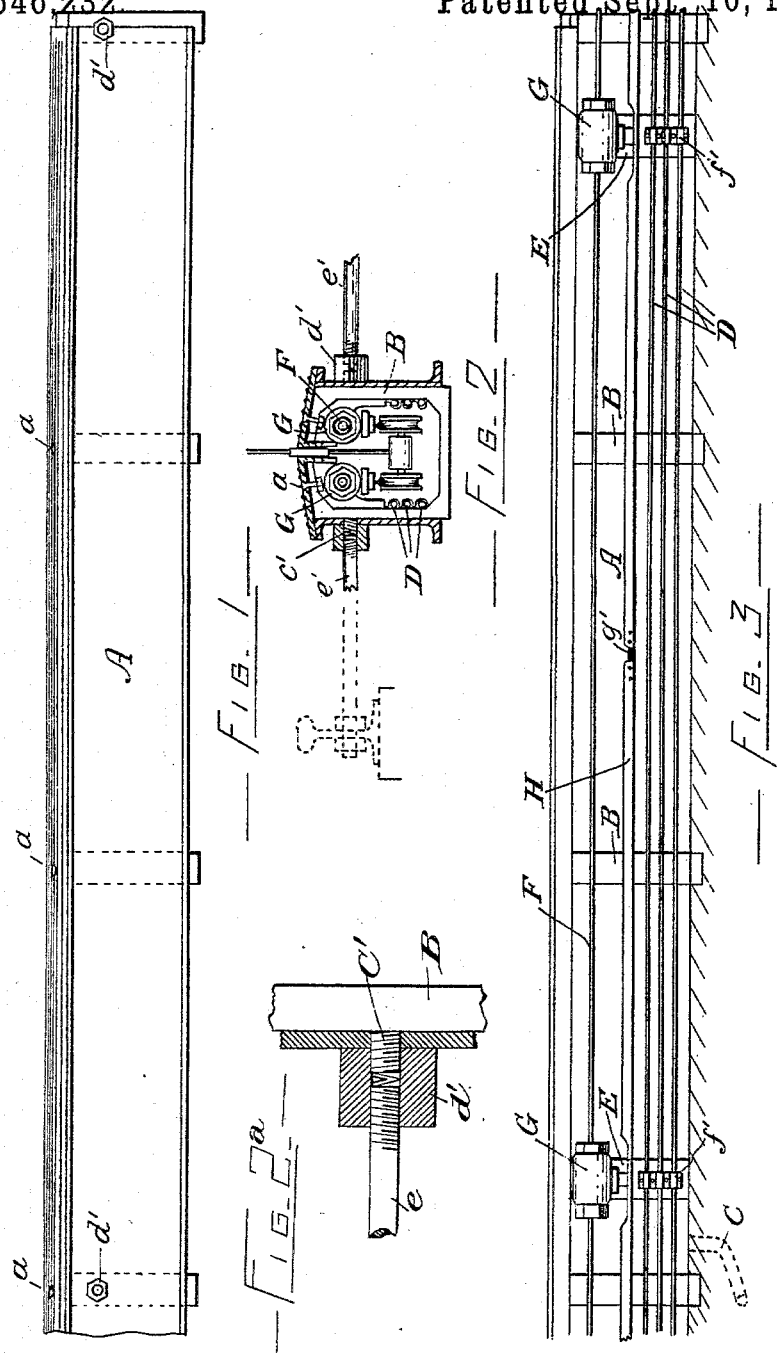

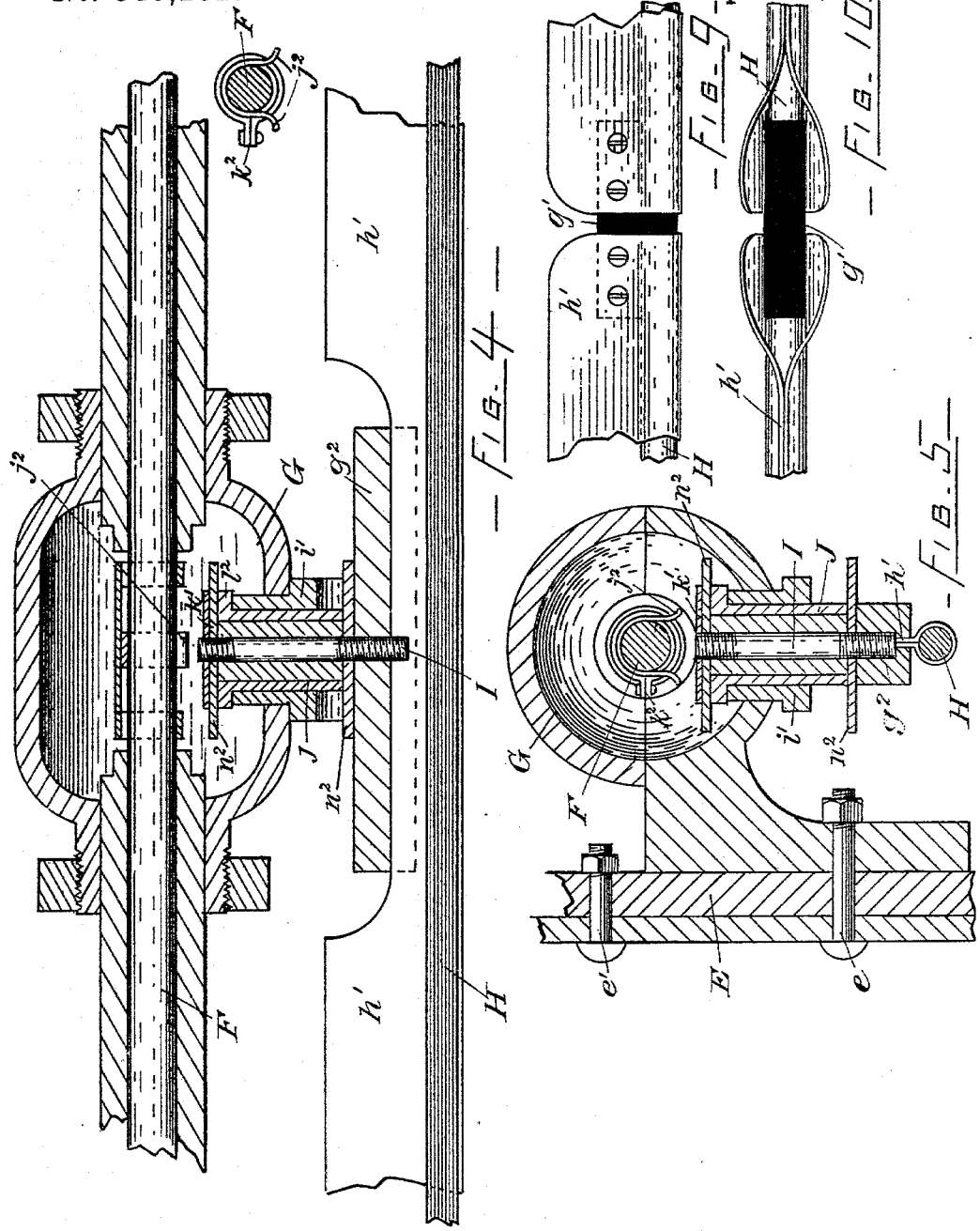

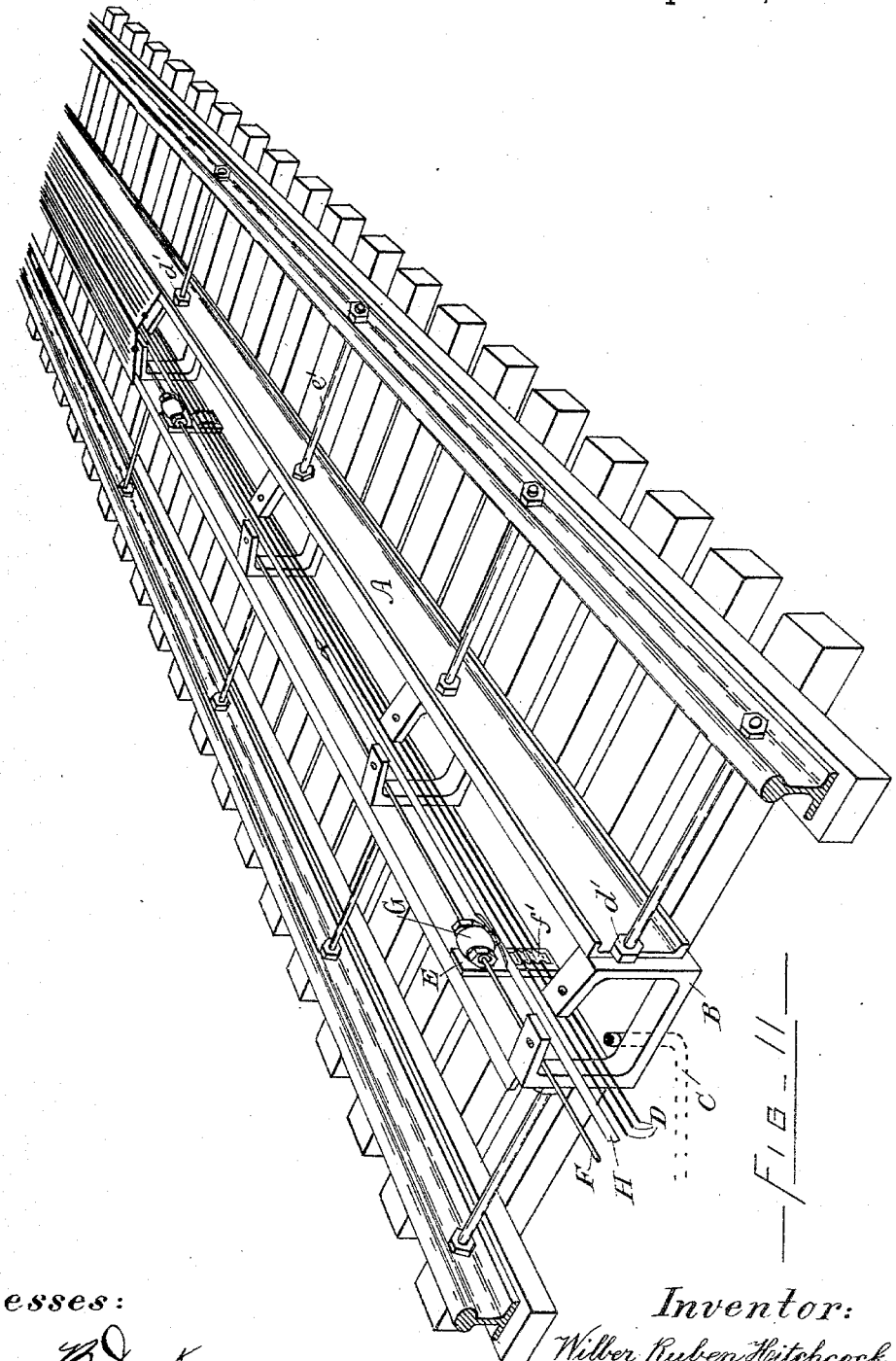

UNITED STATES PATENT OFFICE.

WILBER RUBEN HITCHCOCK, OF CORNWALL, CANADA, ASSIGNOR OF ONE-HALF TO A. W. ANDREWS AND JOHN D. MILLER, OF WALLINGFORD, VERMONT.

INSULATOR, CONDUCTOR, AND CONDUIT FOR ELECTRICAL WIRES AND CABLES.

SPECIFICATION forming part of Letters Patent No. 546,232, dated September 10, 1895.

Application filed October 12, 1894. Serial No. 525,685. (No model.)

*To all whom it may concern:*

Be it known that I, WILBER RUBEN HITCHCOCK, a citizen of the United States, residing at Cornwall, in the county of Stormont and Province of Ontario, Canada, have invented a new and useful Improvement in Insulators, Conductors, and Conduits for Electric Wires and Cables for the Purpose of Supplying Electricity to Motors on Street-Cars, of which the following is a specification.

My invention relates to an improved conduit suitable for running the necessary wires and feeders therein and the method of applying the same to suit the required object.
The special object of my invention is to provide an improved conduit of such a nature as will enable the motors to derive the necessary current from cables and feeders contained therein, and also to permit cables of high potential to be carried through the same conduit without danger to traffic, and to prevent connection of the opposite currents arising through the dripping of water, also to insure the insulation of the cables.
In order that my invention may be the better understood, I will describe the same by making reference to the attached drawings, which represent, in—

Figure 1, a side elevation of a portion of the conduit; Fig. 2, a cross-sectional view of the conduit, showing the trolley-wheels running on the sectional conductor-wires. Fig. 2ª is an enlarged view showing the manner of connecting the rail, the side of the conduit, and the yoke together. Fig. 3 is a longitudinal sectional view of the same, showing the insulated connection boxes and wiring. (All the subsequent drawings are drawn to a much larger scale than the above.) Fig. 4 is a longitudinal section of the insulated connection-box and insulated working conductor, and Fig. 5 is a transverse sectional view of the same. Fig. 6 is a side view of the trolley-arm. Fig. 7 is a front view, and Fig. 8 is a sectional view of the same on line $xx$. Figs. 9 and 10 show the junction of the sectional working conductor. Fig. 11 is a general perspective view showing railway with conduit connected, part of the cover of conduit being omitted.

In the various views similar parts are represented by similar letters.

The conduit A is a four-sided tube, made, preferably, of iron, intended to lie along the center line of the railway, its top surface being level, or nearly so, with the top of the rails.

The sides and top are secured to and supported by a series of cast-iron yokes or frames B, placed at a distance of about four feet apart. On the outside of these yokes are lugs $c'$, which are screw-threaded to receive the nuts $d'$, which secure the sides of the conduit to the yokes. The nuts $d'$ also receive the tie-rods $e'$, by which the rails of the road are connected with the conduit, as shown by dotted lines in Fig. 2.

The top of the conduit is made in two parts (see Fig. 2) sloping upward as they extend inward to within a short distance of each other. The two inner edges of the top are held apart, so as to form a continuous open slot for the passage of the trolley-arm, reaching from the car into the conduit. The inner edges of the top are projected downward, (see Fig. 2,) so as to give the necessary vertical strength. The outside surface of the top is scored or corrugated, so as to prevent horses slipping upon it. Being secured to the yokes simply by screws or bolts $a$, as shown in Figs. 1 and 2, the top is easily removed when access to the interior is desired.

The bottom or floor of the conduit is cemented and is sloped or graded so that any water in the conduit will settle toward certain points, from which it is drawn off by drip-pipes C, leading to any neighboring sewers or drains. Extra feed-wires D are secured by metallic clips $f'$ to insulated blocks E, which blocks are secured to the sides at about ten feet apart by suitable bolts $e\ e'$. F is a working insulated feeder, supported in the conduit by the insulated connection-boxes G, which are rigidly secured to the insulated blocks E and to the sides of the conduit by the bolts $e$. These insulated connection-boxes G are made hollow, and the insulation is removed from the working feeder F at those portions which are within the connection-boxes G, so as to insure perfect contact between the sectional working feeder and the insulated working feeder. The connection-box G is preferably made in two sections, as shown clearly in Fig. 5.

H is a sectional working conductor made in lengths of about ten feet, which are joined together by insulated blocks $g'$. The wire of this conductor is made rigid vertically by being incased in a galvanized-iron covering, the two edges of said covering being brought together and turned upward, so as to form the stiff rib $h'$. The trolley-wheels run against the under side of this conductor, and current connection is made between it and the working insulated feeder F through the conducting-pins I, which are rigidly attached to blocks $g^2$ and are held in non-conducting casings J, which slide easily through sleeves $i'$, screwed in the under side of the connection-boxes, and allow the pins I to be brought in contact with the wire of the insulated feeder F, from which at this point the insulating-covering is removed, so as to allow of a perfect contact, as above set forth. A device is also here introduced for extending the field of contact, consisting of a spring-clip $j^2$, fastened to the feeder F by a bolted clasp $k^2$, and the metallic disk $k'$, which is screwed on the top end of the pin I. The flexible ends of the spring-clip meet the disk $k'$ in advance of the contact of the feeder F and pin I and increase the contact. A mica insulator $n^2$ is placed between this disk and the flange $l^2$ and a similar one between the casing J and block $g^2$, which insures that the whole current must pass through the pin I.

The weight of the working conductor H would draw the pins I out of the connection-boxes were it not prevented from doing so by the disk $k'$ on the end of the pin I and the flange $l^2$, which is formed on the upper end of the casings J and lies upon the top of the sleeve $i'$. The length of the trolley-arm from the car-track is so adjusted that as the car approaches one of the connection-boxes the trolley-wheels lift the working conductor, raising the pin and forcing it against the wire of the insulated feeder F, thus leading the current to the car-motor. When the car has passed the box, the weight of the conductor draws the pin away from the feeder and shuts off the current, and the onward motion of the car makes similar connection with the box ahead of the car.

The construction of the trolley-arm is substantially as follows: To the car-truck are secured in any desired manner the two rods $l'$, which lie transversely of the truck. These rods pass through the cross-heads $m'$ of the body K, which slide easily endwise upon said rods, and thus allow for the lateral swaying of the car. The cross-heads $m'$ and body K are either cast or rigidly secured together. A slot $n'$ is formed vertically through the body K, and has placed in it the friction-pulleys $o'$. The trolley-arm L plays vertically through the slot $n'$ and between the pulleys $o'$. It is supported by a stirrup M, which is suspended by springs $p'$ from the arms $q'$ and holds against a lug $r'$, formed upon the arm. In the trolley-arm there are made two channels. (Indicated in Fig. 6 by dotted lines.) The ends of one of these channels open out through one side of the arm, near its upper and lower ends, and those of the other channel open through the opposite side. One of these channels contains the positive and the other the negative wire, leading from the trolley to the motor. In order to provide for the easy turning of the curves without unduly straining the mechanism, the trolley-head N is made in three parts, the central part being attached to the arm L so as to swing upwardly and downwardly and the forward and rear parts, which each carry one of the trolley-wheels, are hinged to it so as to swing laterally and adapt themselves to any curves or unevenness in the wires. Breakage of the body K by violent or sudden twisting of the arm L is provided against by a gap formed in the side of the body, and which is kept filled by the cap $s'$, which is held in place by a spring $t'$, which holds endwise in the lugs $u'$. Should the arm L be accidentally turned with sufficient force, both the cap $s'$ and the spring $t'$ would simply be thrown out of place without any necessary breakage.

What I claim is—

1. A sectional working conductor, comprising suitable insulating blocks, and sections joined together by said insulating blocks, each of said sections comprising a wire and a strip of conducting material incasing said wire, the two edges of the strip being brought together and turned upwardly to form a stiff rib, whereby the said section is made rigid vertically, substantially as set forth.

2. The combination with the insulated feeder F and conducting pin I, of the spring clip $j^2$ held by the bolted clasp $k^2$, the disk $k'$ secured to the pin I, and the mica insulators $n^2$, substantially as set forth.

3. In combination with an electrical railway conduit containing wires and cables, an arm connected with a car and carrying a trolley inside said conduit, a slotted body attached to the car through which the arm slides vertically, a cap piece covering a gap in the side of said body and a spring for holding in place said cap piece, substantially as set forth.

Signed at Ottawa this 15th day of September, 1894.

WILBER RUBEN HITCHCOCK.

In presence of—
A. BUNAN,
JOS. MATTE.